US012425765B1

(12) United States Patent
Coombs

(10) Patent No.: US 12,425,765 B1
(45) Date of Patent: Sep. 23, 2025

(54) IN-CELING 3-WAY MINIMAL OPENING BANDPASS SPEAKER

(71) Applicant: Origin Acoustics, Las Vegas, NV (US)

(72) Inventor: Jeffery James Coombs, Lake Havasu City, AZ (US)

( * ) Notice: Subject to any disclaimer, the term of this patent is extended or adjusted under 35 U.S.C. 154(b) by 239 days.

(21) Appl. No.: 18/204,364

(22) Filed: May 31, 2023

Related U.S. Application Data

(60) Provisional application No. 63/347,521, filed on May 31, 2022.

(51) Int. Cl.
*H04R 1/32* (2006.01)
*H04R 1/02* (2006.01)
*H04R 1/26* (2006.01)

(52) U.S. Cl.
CPC ............. *H04R 1/323* (2013.01); *H04R 1/025* (2013.01); *H04R 1/26* (2013.01); *H04R 2201/021* (2013.01); *H04R 2201/029* (2013.01)

(58) Field of Classification Search
CPC .................................... H04R 5/02; H04R 1/02
See application file for complete search history.

(56) References Cited

U.S. PATENT DOCUMENTS 5,221,069 A * 6/1993 Struthers ................ H04R 1/025 248/314

* cited by examiner

*Primary Examiner* — Kile O Blair
(74) *Attorney, Agent, or Firm* — Paul B. Heynssens Attorney at Law, PLC

(57) ABSTRACT

The present example provides a typically ceiling mounted architectural three way speaker with a typically minimal appearance that includes an integral woofer, a ribbon speaker and a ported enclosure. The three way speaker is constructed so that sound from the woofer and tweeter is created in the enclosure and directed through an aperture shared with a midrange speaker.

16 Claims, 14 Drawing Sheets

700

700

700

700

Method of installing a speaker box in a cut out opening 1501

Small Aperture In-Ceiling 3-Way Speaker Legend

For FIGs. 13- FIG. 14

| | |
|---|---|
| 40 | Exploded View Small Aperture In-Ceiling 3-Way Speaker |
| 50 | Cut Away View / Sound Output Paths |
| 11 | Top Cover |
| 12 | Top & Bottom Cover "O" Ring Seal |
| 13 | Subwoofer Driver |
| 14 | Main Enclosure, Baffle Plate & Port Tube |
| 15 | Adjustable Mounting Bracket |
| 16 | Signal Input Connector |
| 17 | Crossover Network |
| 18 | Port Tube "O" Ring Seal |
| 19 | Bottom Cover |
| 20 | Mid / High Range Enclosure |
| 21 | Mid / High Range Coaxial Speaker Module |
| 22 | 1/8" Spacer |
| 23 | 3/8" Spacer |
| 24 | 1/2" Drywall Mud Ring |
| 25 | Radial Subwoofer Port |
| 26 | High Frequency Output |
| 27 | Mid Frequency Output |
| 28 | Subwoofer Output |

FIG. 12

IN-CELING 3-WAY MINIMAL OPENING BANDPASS SPEAKER

TECHNICAL FIELD

This description relates generally to home entertainment electronics and more specifically to audio and visual systems.

BACKGROUND

Loudspeakers typically refer to an audio reproduction component, or transducer, that converts an electrical signal to sound, The term loudspeaker can refer to an enclosure or cabinet that contains one or more individual speakers sometimes referred to as drivers or driver speakers (because they "drive" the surrounding air). A signal containing all audio frequencies may be applied to a single speaker to reproduce the entire audio signal. However, certain frequencies may not be reproduced faithfully due to the limitations of constructing a driver to reproduce all frequencies from low to high. For example high pitched sounds may roll of or be attenuated, and low frequency has sounds may sound muddied.

Individual drivers may be constructed, or optimized to reproduce a range of audio frequencies better than other frequencies. And, often a plurality of drivers may be provided to reproduce an audio signal. The drivers may also be disposed in different enclosures or housings, or alternatively in a common housing—with each speaker transmitting directly into a room. A freestanding floor speaker is a typical example. Electronics typically called a crossover network may be provided within an enclosure to split or route incoming audio signal frequencies into bands of signals most appropriately applied to a driver designed for that frequency range's optimal reproduction. In the past such networks have been passive circuits; such circuits were in effect a filter network.

Drivers suitable for low frequency reproduction often tend to be physically large to reproduce low frequency signals accurately. And also to reproduce the low frequency signals the driver components do not move fast, so heavier components may be used. High frequency drivers may be small in size, since their components must move faster in reproducing high pitched signals, thus light weight elements that move the air are desirable.

Inexpensive loudspeakers may just utilize a single driver. However in premium loudspeaker systems multiple drivers may be incorporated in the speaker system. Various driver may include tweeters (for reproduction of high frequencies), mid-range drivers (for reproduction of midrange frequencies), woofers (for reproduction of low frequencies), and increasingly sub-woofers (for reproduction of very low frequencies). Sub woofers produce a sound that is often felt as much as heard. Sub woofers are typically responsible for the effect produced when a teenager in a car pulls up next to another car, and even though the adjacent car has its windows closed the low frequencies emanating from said teenager's car stereo tend to make objects on the adjacent car's dash rattle. Aside from loud speaker systems being applied to cars their application has also been made to outdoor, and in particular to premium indoor, sound systems.

Indoor audio systems typically try to hide or conceal the speakers in order to preserve space in a room without cluttering it with audio equipment. As described above home audio equipment typically includes a multitude of speakers, each directly facing into a room in which their sound is sought to be reproduced into. With home audio systems having multiple channels the room can become quite cluttered with speakers. Accordingly speakers may sought to be concealed, or otherwise be made less obtrusive in appearance. For Example woofers may be mounted behind furniture, and midrange and tweeters may be mounted in walls or in ceilings. However, each speaker still has a transducing surface, and that transducer's surface contacts, or directly faces the air in the room. It would be desirable to reduce the surface area occupied by speakers in a room in order to further conceal the presence of speaker systems.

Accordingly, there exists a need for an improved nonintrusive indoor speaker installation which obviates the above and other deficiencies of indoor speakers such as cluttering a room with audio speakers, and their associated openings.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present example of a in-ceiling 3-way minimal opening bandpass speaker provides a typically ceiling mounted architectural three way speaker with a typically minimal appearance that includes an integral woofer, a ribbon speaker and a ported enclosure. The three way speaker is constructed so that sound from the woofer and tweeter is created in the enclosure and directed through an aperture shared with a midrange speaker.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein:

FIGS. 12-14 show assembly drawings of the in-ceiling 3-way minimal opening bandpass speaker;

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

The examples below describe an adjustable sound bar system. Although the present examples are described and illustrated herein as being implemented in a horizontal rectangular sound bar system, the system described is provided as an example and not a limitation. As those skilled in the art will appreciate, the present examples are suitable for application in a variety of different types of mounting such as vertical, and differing shaped systems (such as oval square, round, and the like).

The examples below also describe an in ceiling three way speaker system. Although the present examples are described and illustrated herein as being implemented in a three way system, the system described is provided as an example and not a limitation. As those skilled in the art will appreciate, the present examples are suitable for application in a variety of different types of ceiling speaker systems such as two way and the like.

Figure 1:
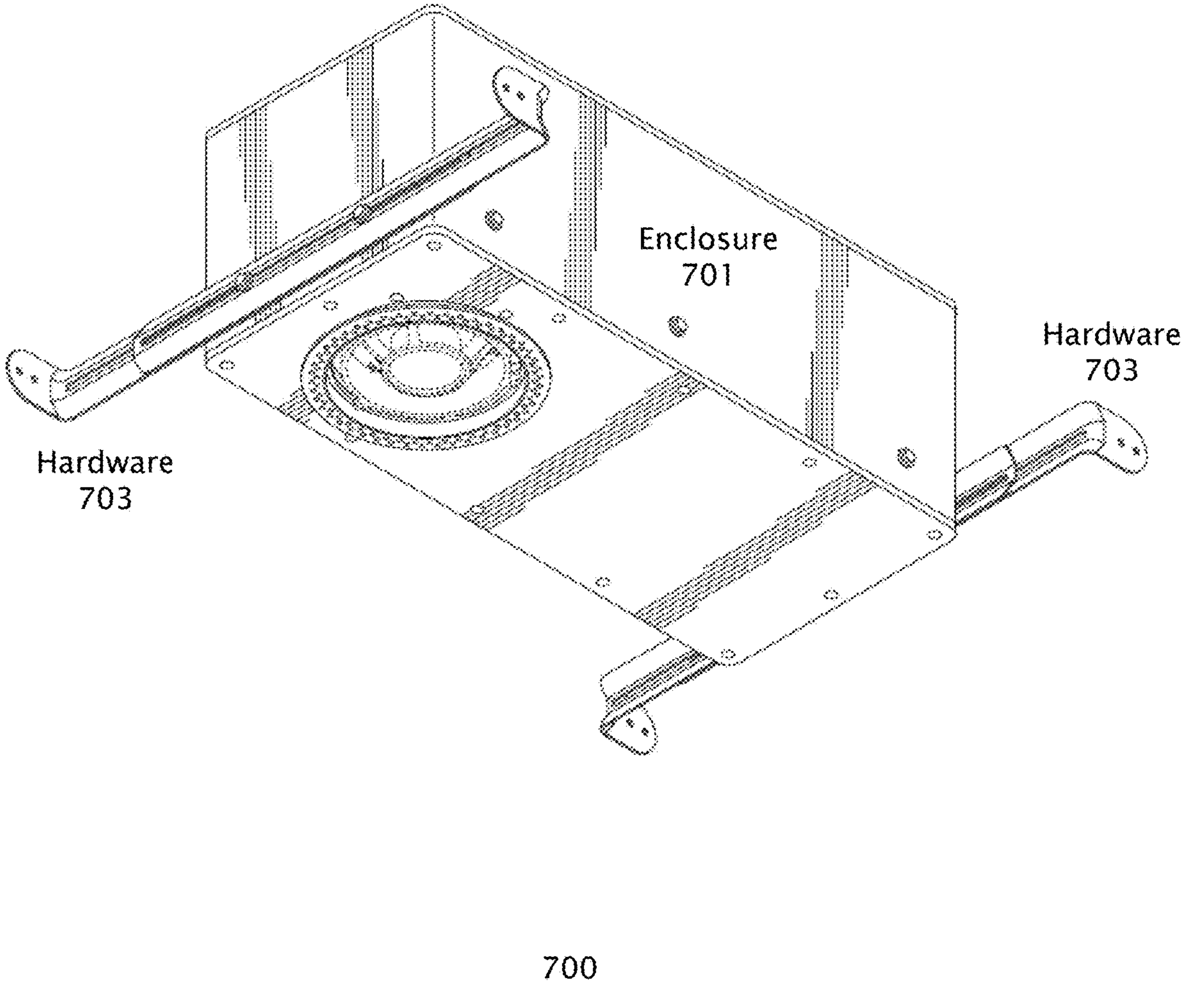
FIG. 1 is a bottom perspective view of an in-ceiling 3-way minimal opening bandpass speaker.

FIG. 1 is a bottom perspective view of an in-ceiling 3-way minimal opening bandpass speaker 700.

Figure 2:
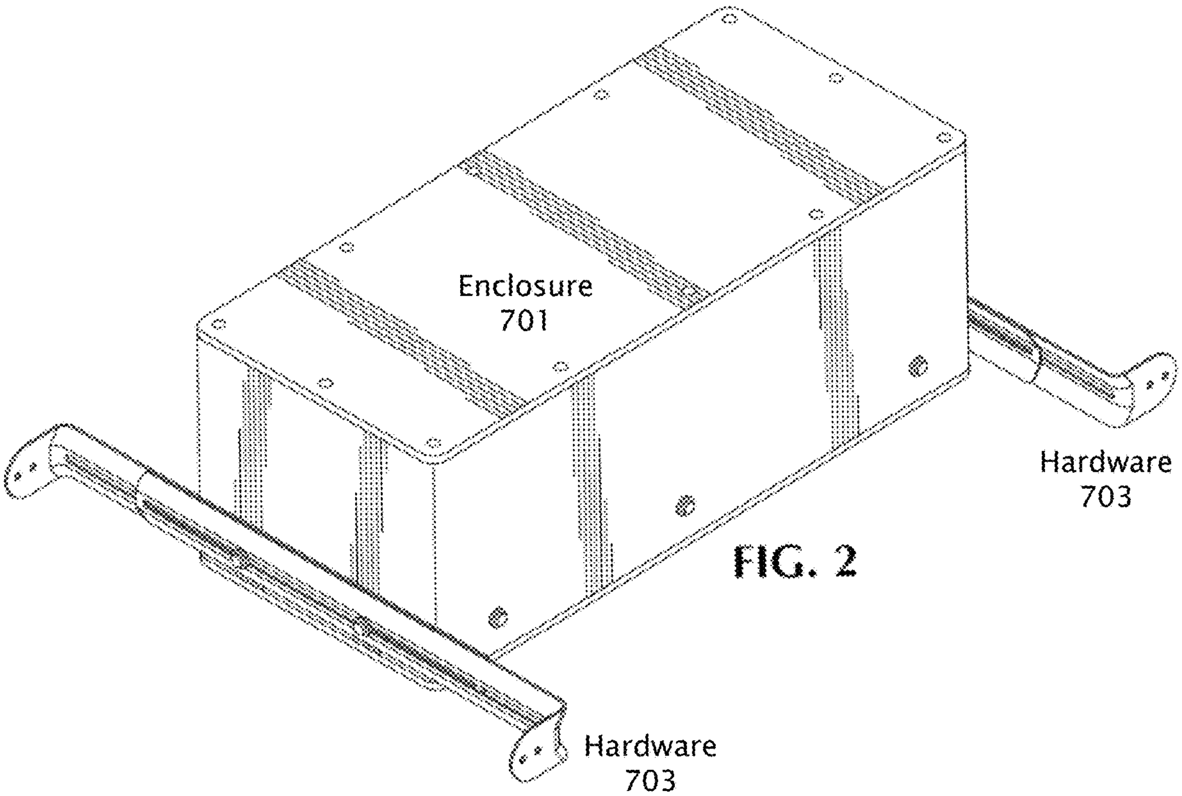
FIG. 2 is a bottom perspective view thereof.

FIG. 2 is a bottom perspective view thereof.

Figure 3:
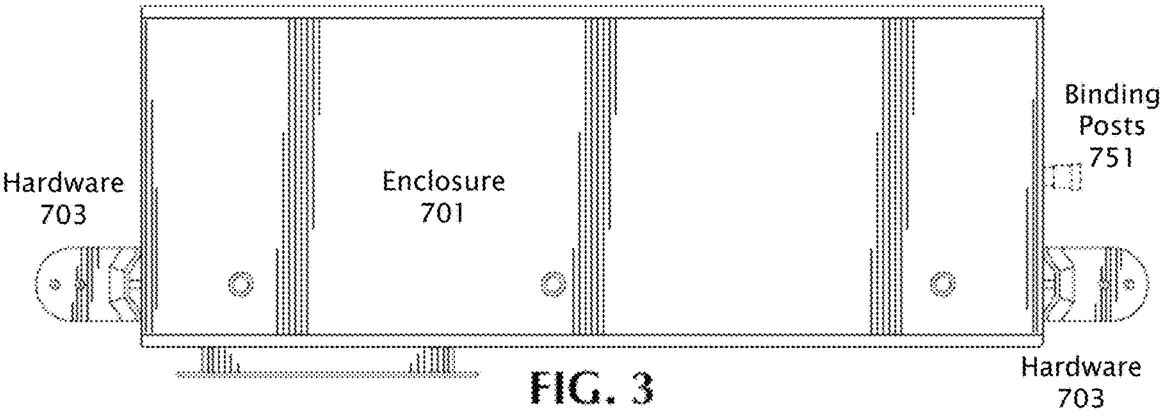
FIG. 3 is a front view thereof.

FIG. 3 is a front view thereof.

Figure 4:
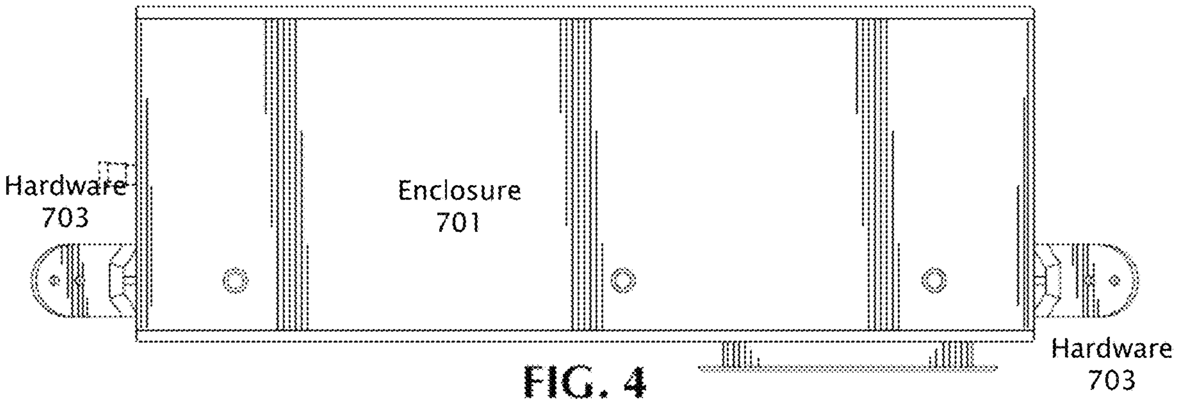
FIG. 4 is a back view thereof.

FIG. 4 is a back view thereof.

Figure 5:
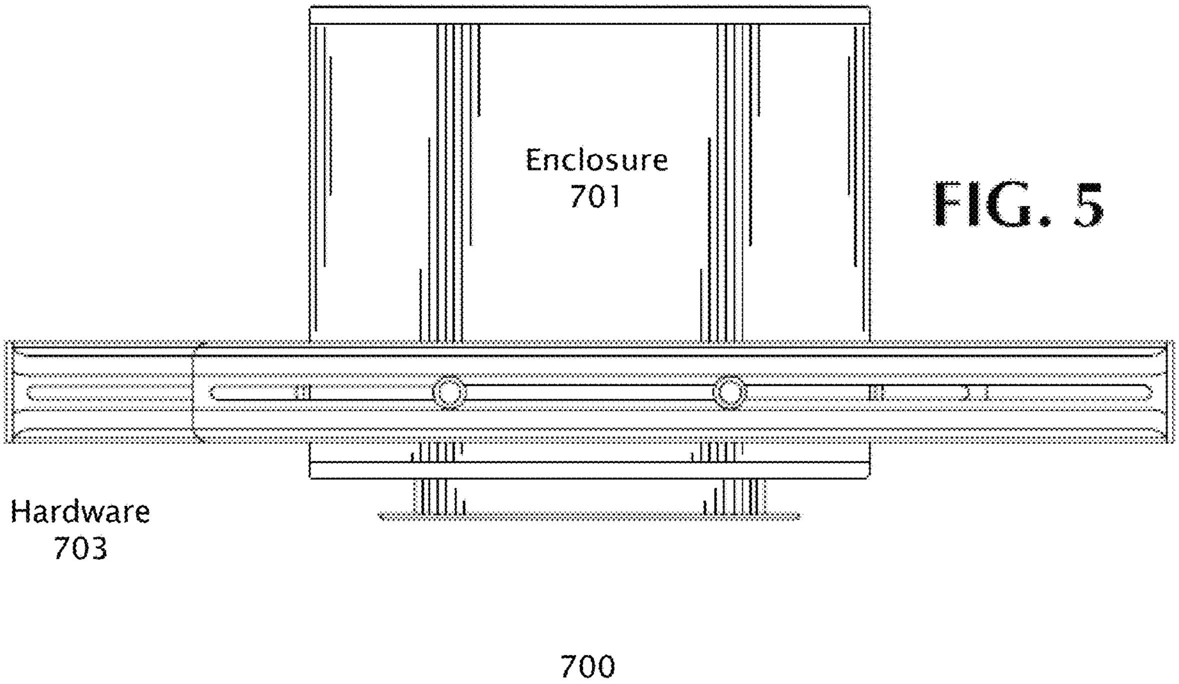
FIG. 5 is a left view thereof.

FIG. 5 is a left view thereof.

Figure 6:
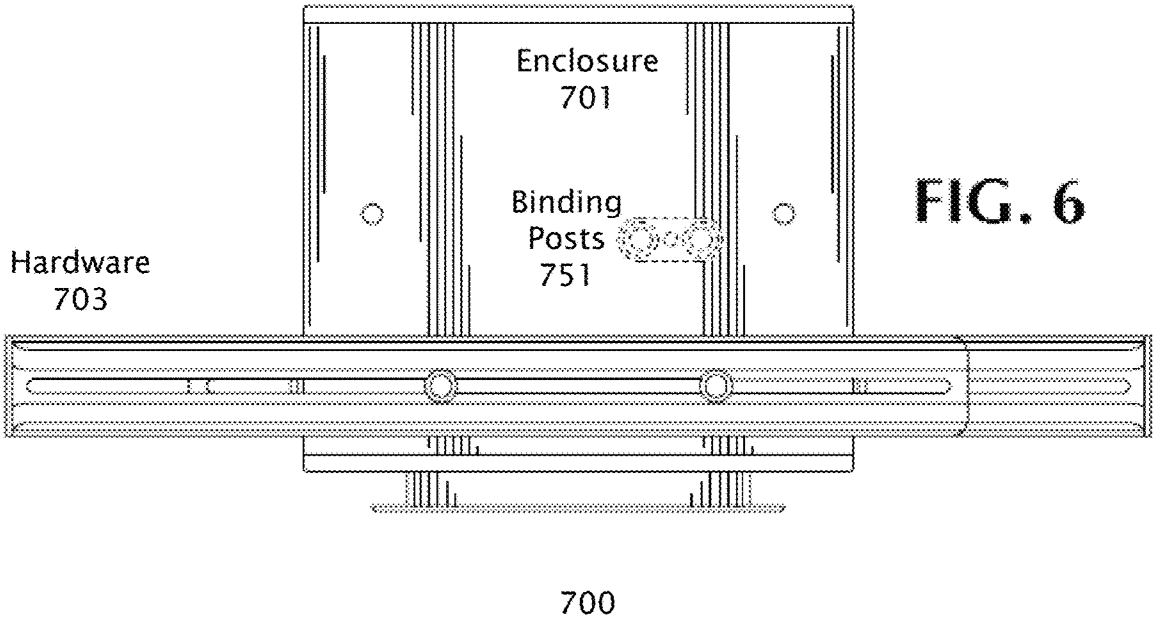
FIG. 6 is a right view thereof.

FIG. 6 is a right view thereof.

Figure 7:
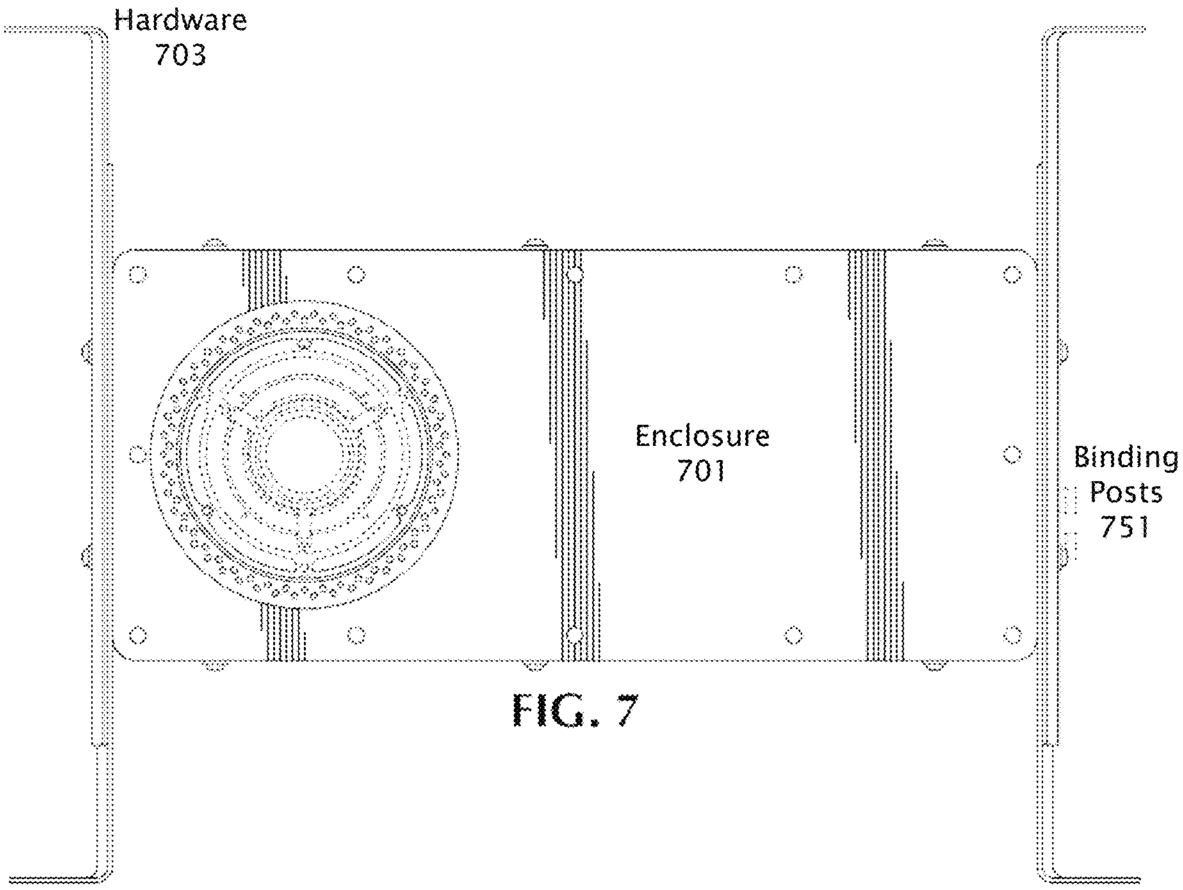
FIG. 7 is a bottom view thereof.

FIG. 7 is a bottom view thereof.

Figure 8:
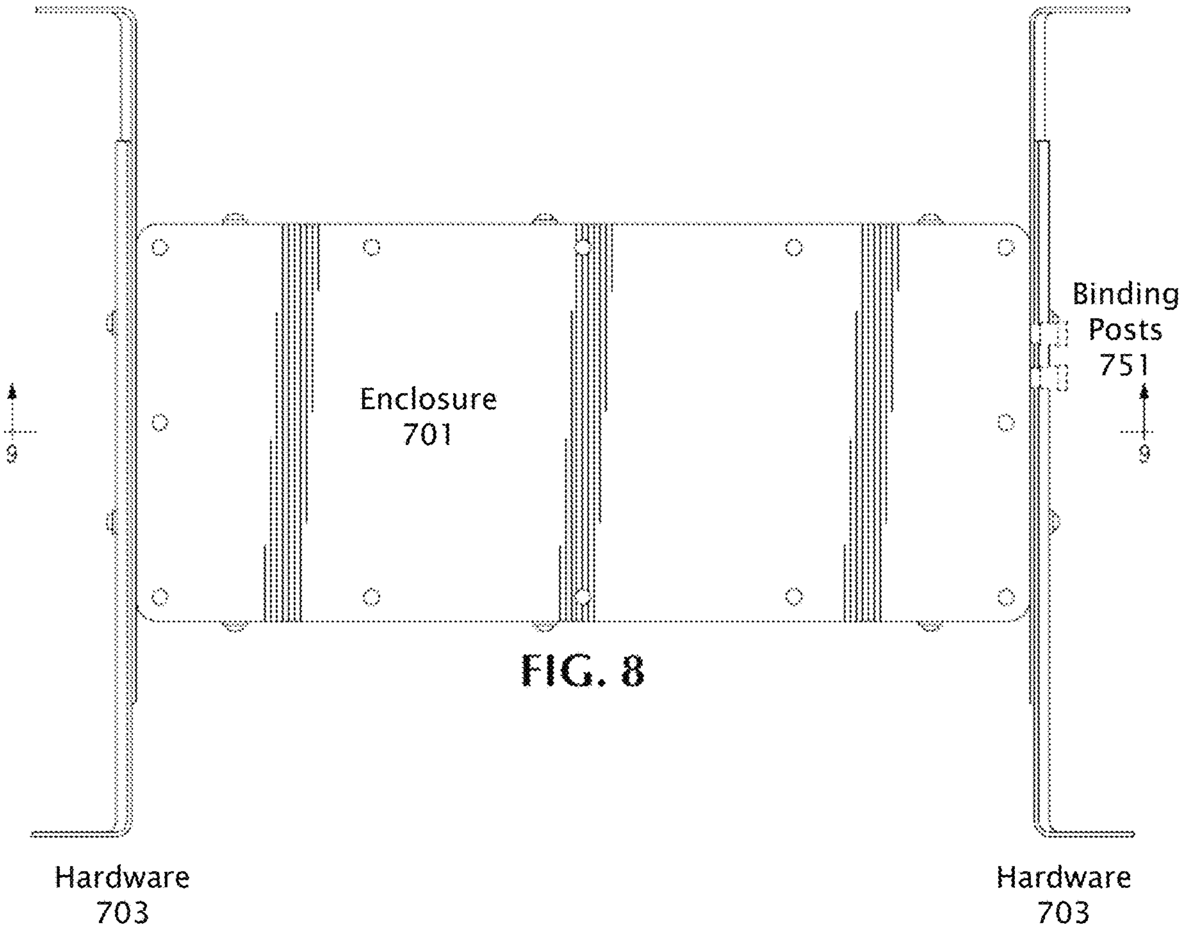
FIG. 8 is a top view thereof.

FIG. 8 is a top view thereof.

Figure 9:
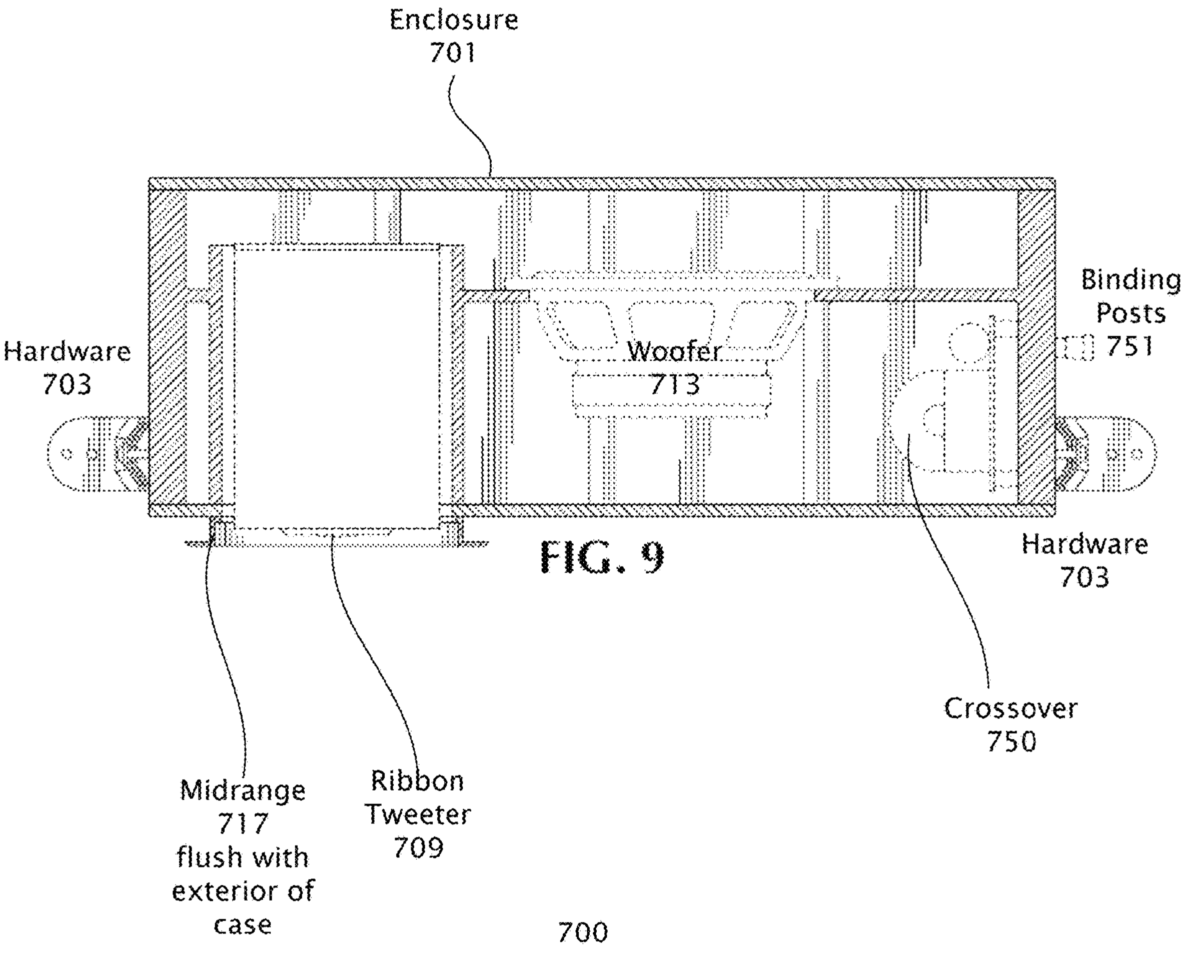
FIG. 9 is a cross sectional view showing the interior thereof.

FIG. 9 is a cross sectional view showing the interior thereof.

FIGS. 1-9 show the external construction of the example of an in-ceiling 3-way minimal opening bandpass speaker 700. A pair of binding posts or terminals 751 (alternatively a Phoenix connector, spring push terminals, or the like may be utilized) are provided to accept an input audio signal. The enclosure may include mounting brackets or hardware 705 to facilitate in ceiling mounting. And a circular aperture with a grille made of conventional speaker grille material (not shown in FIGS. 1-9) is present on the enclosure face that typically is orients towards the floor (and is parallel to the floor). The aperture is shown as circular however other shapes are equivalently contemplated. The aperture may also be configured to stand off from the enclosure body so that the enclosure may be mounted behind a ceiling panel with only the grill covering the aperture visible on the ceiling.

Figure 10:
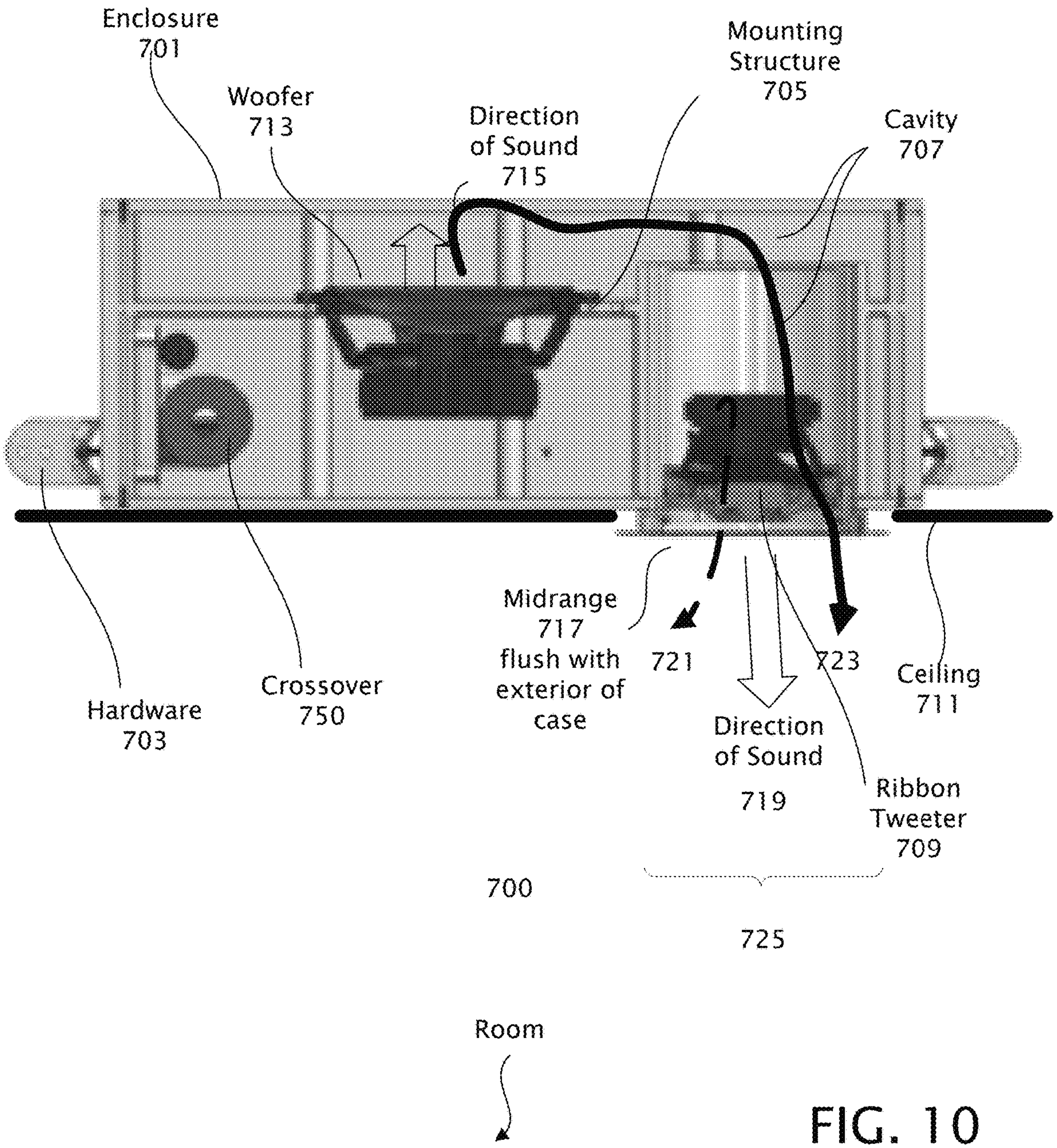
FIG. 10 shows an example of an in-ceiling 3-way minimal opening bandpass speaker.

FIG. 10 shows an example of an in-ceiling 3-way minimal opening bandpass speaker 700. An enclosure 701 including a tuned cylindrical cavity (with dimensions chosen to produce a desired response by methods known to those skilled in the art) 707, positioned in the enclosure as shown, and is provided with suitable mounting hardware 703 to facilitate mounting in a ceiling. An internal frame structure 705 is provided to support two or more speakers disposed in the cavity 707 formed by the enclosure 701. The tuned cavities in the enclosure are specially tuned to produce a desired sound quality. The mounting surface 705 supports the woofer 713 and is part of—or alternatively coupled to the cavity wall and to the cavity 701 for mechanical support of the woofer.

The midrange speaker 717 and coaxial tweeter 709 face the floor and are disposed in the cavity 707 of the housing or enclosure 701 with the mounting ears of its cone parallel to the exterior surface of the enclosure. The rear surface of the midrange is disposed within a cylindrical sub cavity 707 of the enclosure 701. The internal structure may also have space to accommodate cross over circuitry 750 provided to route the appropriate frequencies to the proper speaker.

A cross over network 750 is located in the cavities and is coupled to the tweeter 709, midrange 717, and woofer 713. A cross over network 750 is conventionally constructed as is known to those skilled in the art.

A ribbon tweeter 709 is provided coaxially with the midrange 717 and oriented so that its axis is perpendicular to the ceiling 711.

A woofer 713 is centrally mounted in the enclosure with its output directed upward 715, with its sound reflecting off the back surface of the enclosure 701. Woofer 713 is conventionally constructed. Mounting of the sound axis of the woofer and midrange 717/tweeter 709 combinations are in parallel, with the sound being emitted in opposite directions—the woofer upwards, and the midrange 717/tweeter 709 downward, and with their sound paths coupled by the cavity 707.

By virtue of the unique construction of the speaker assembly 700, sound created in the enclosure 701 flows out a common opening with the midrange 717/ribbon tweeter speaker 709, via path 721. By virtue of the unique construction of the speaker assembly 700, sound created in the enclosure 701 by the woofer 713 reflects off the enclosure back wall and flows out a common opening with the midrange speaker 717, via path 723 through the cavity 707. Sound from the midrange speaker 717 emits from the face of the opening 719. Accordingly output from all three speakers is emitted from a single aperture 727 in the enclosure.

Figure 11:
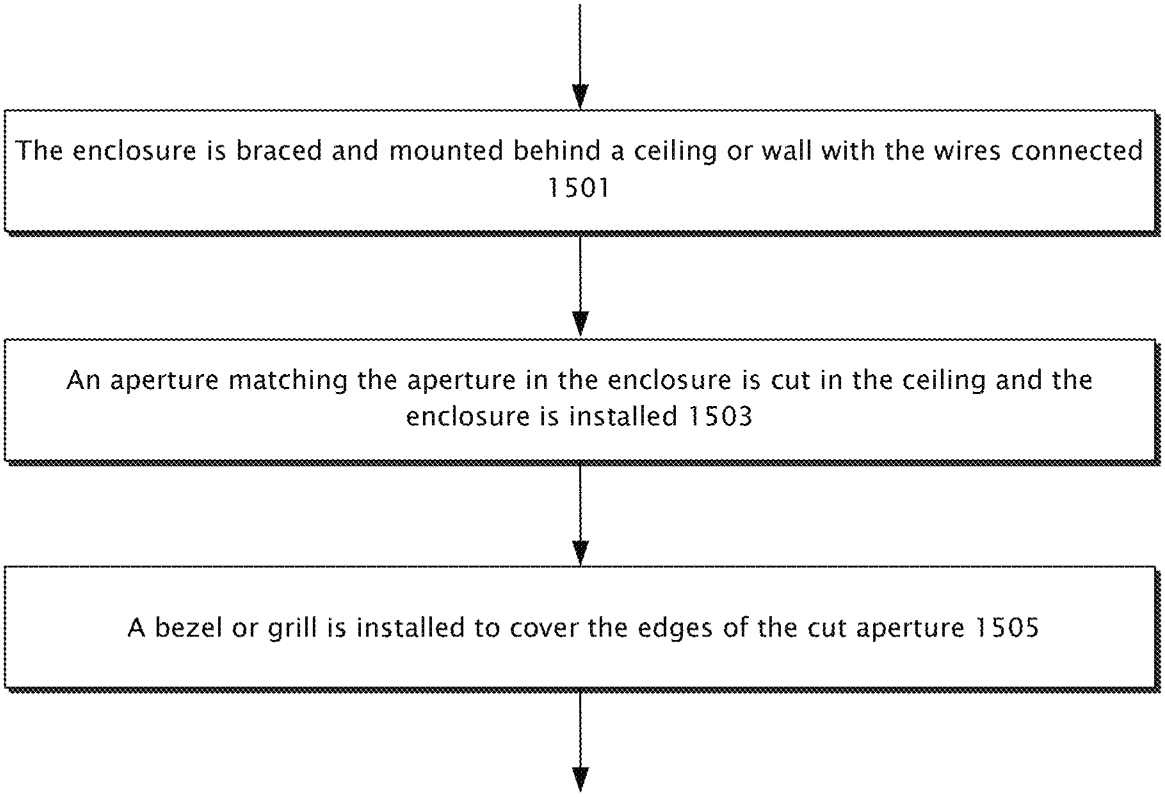
FIG. 11 shows a method for installing the in-ceiling 3-way minimal opening bandpass speaker.

FIG. 11 shows a method for installing the in-ceiling 3-way minimal opening bandpass speaker. The enclosure is braced and mounted behind a ceiling or wall with the wires connected 1501. An aperture matching the aperture in the enclosure is cut in the ceiling and the enclosure is installed 1503. A bezel or grill is installed to cover the edges of the cut aperture 1505.

Figure 13:
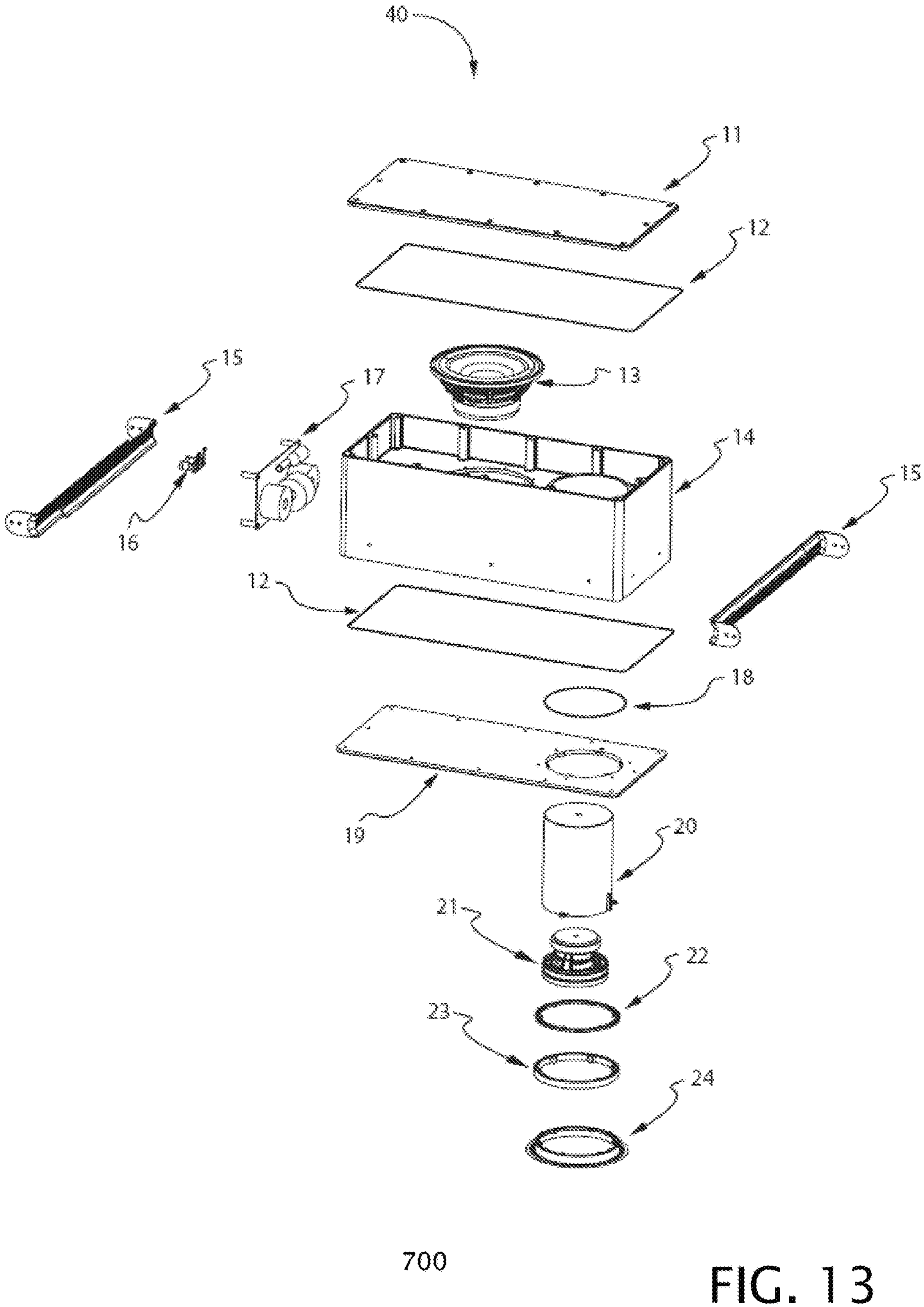
Figure 14:
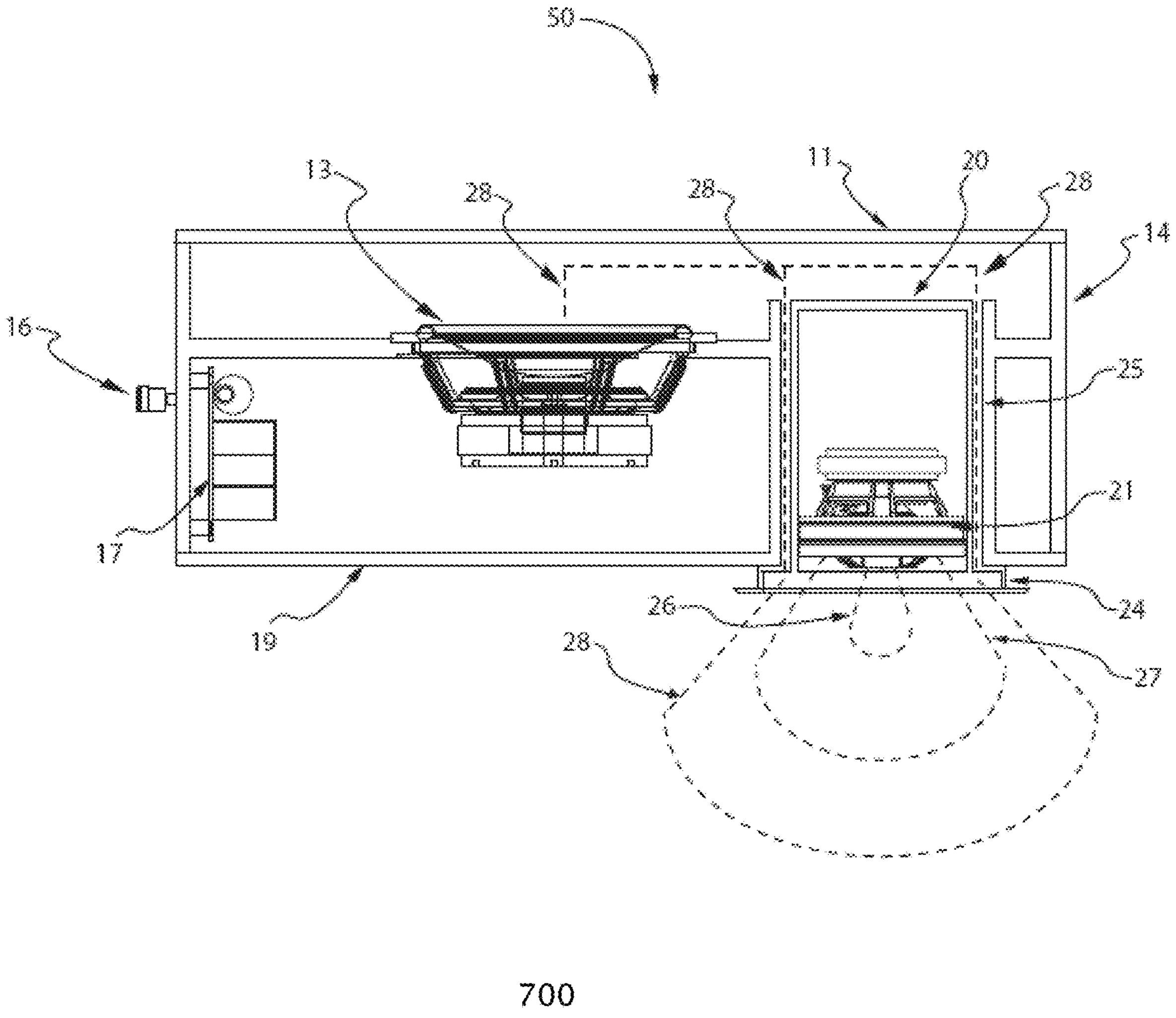

FIGS. 12-14 show assembly drawings of the in-ceiling 3-way minimal opening bandpass speaker. In FIGS. 13-14 the reference designations shown in FIG. 12 are utilized.

Figure 15:
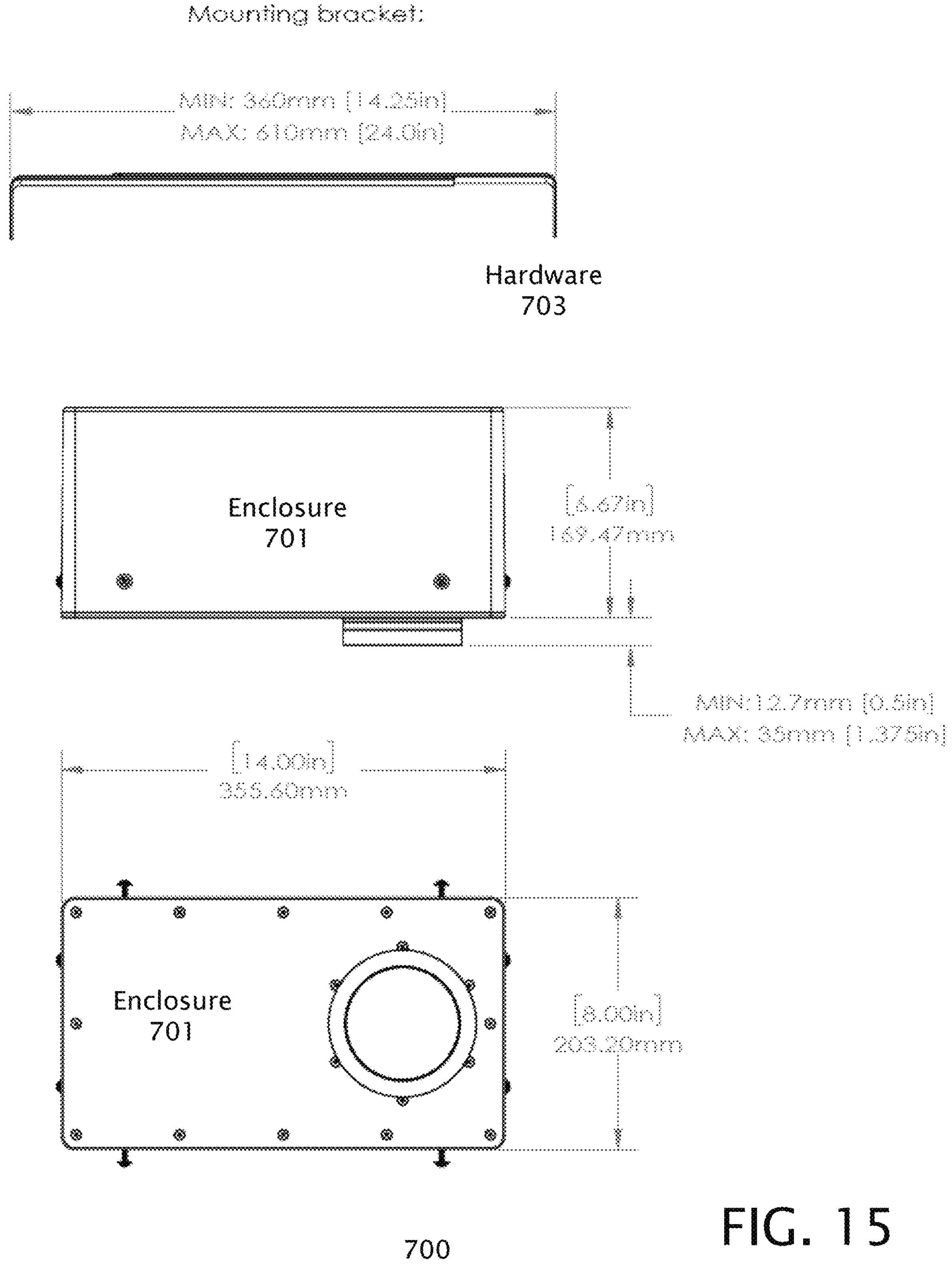
FIG. 15 shows an example of dimensions of the in-ceiling 3-way minimal opening bandpass speaker, alternatively named a "minimum opening speaker"
Figure 16:
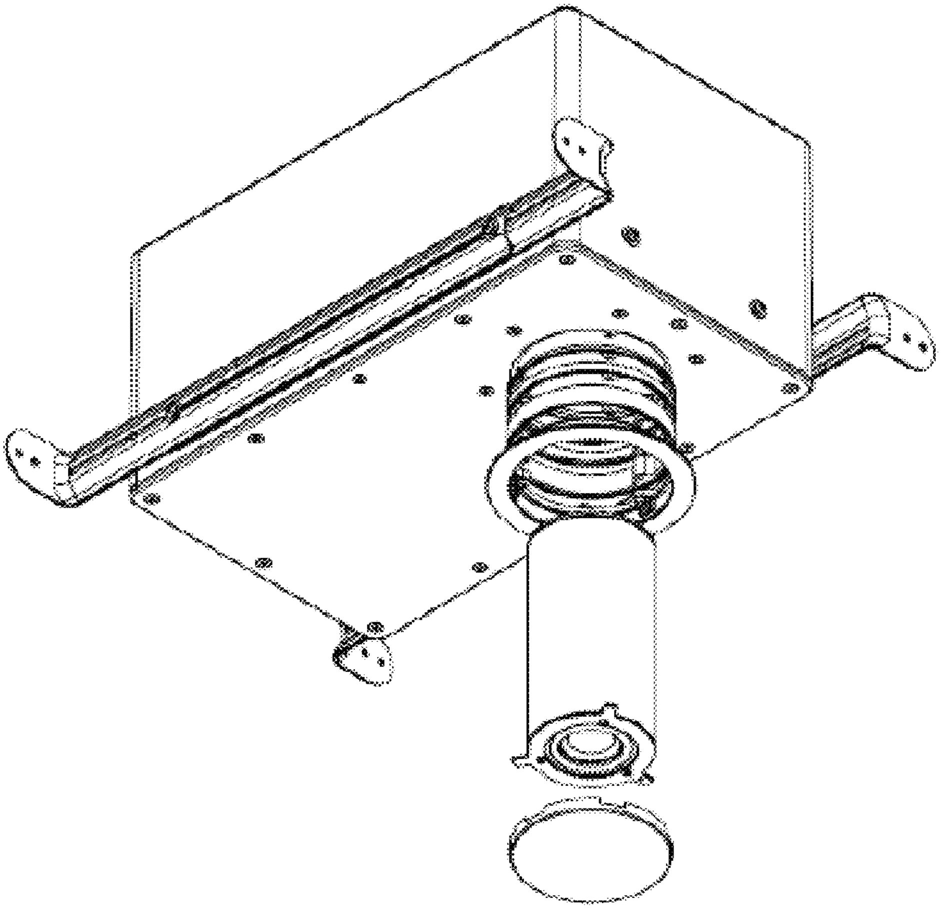
FIG. 16 Shows an exploded view of the coaxial tweeter and midtrange speaker assembly.

FIGS. 15-16 show an example of the in-ceiling 3-way minimal opening bandpass speaker, alternatively named a "minimum opening speaker". The dimensions are exemplary and reflect those chosen for this implementation. The exemplary specifications for the minimum opening speaker are shown in FIG. 15. FIG. 16 shows an exploded view of the midrange and tweeter that are assembled into the enclosure 701. The enclosure 701 may be UL94V-0 rated Injection molded material or equivalent.

Those skilled in the art will realize that the process sequences described above may be equivalently performed in any order to achieve a desired result. Also, sub-processes may typically be omitted as desired without taking away from the overall functionality of the processes described above.

1. An in ceiling speaker enclosure assembly comprising a ported housing including a first mounting strut coupled to an edge of a first surface, and a second mounting strut attached to a second edge of the first surface;

a midrange enclosure providing an opening from an interior of the ported housing to the outside of the ported housing;

a tweeter disposed in the midrange enclosure configured to emit sound at an exit aperture of the ported enclosure;

a midrange disposed in the midrange enclosure, ported to directly emit sound; and a woofer configured to emit sound within the ported housing.

2. An in ceiling speaker enclosure assembly comprising a ported housing (701) including a tuned cavity (707);

a woofer (713) mounted in the ported housing (701); and a midrange speaker (717) and a ribbon tweeter (709) assembly disposed in an interior of the tuned cavity (707) such that the woofer (713) and the midrange speaker (717) and a ribbon tweeter (709) assembly are acoustically coupled via the tuned cavity (707).

3. The in ceiling speaker enclosure assembly of claim 2, in which the woofer (713) emits sound in an upward direction, and the midrange speaker (717) and a ribbon tweeter (709) combination emit sound in a downward direction.

4. The in ceiling speaker enclosure assembly of claim 2, in which the woofer (713), and the midrange speaker (717) and a ribbon tweeter (709) combination are coupled electrically via a crossover network.

5. The in ceiling speaker enclosure assembly of claim 2, in which the tuned cavity is cylindrical.

6. A method of installing a speaker enclosure comprising:

cutting an aperture in a ceiling;

mounting an enclosure in the ceiling;

bracing the enclosure in the ceiling;

connecting wires to terminals of the enclosure; and installing a bezel to cover a gap between the enclosure and the ceiling aperture.

The invention claimed is:

1. An in ceiling speaker enclosure assembly comprising a ported housing including a first mounting strut coupled to an edge of a first surface, and a second mounting strut attached to a second edge of the first surface;

a midrange enclosure providing an opening from an interior of the ported housing to the outside of the ported housing;

a tweeter disposed in the midrange enclosure configured to emit sound at an exit aperture of the ported enclosure;

a midrange disposed in the midrange enclosure, ported to directly emit sound; and a woofer configured to emit sound within the ported housing.

2. The in ceiling speaker enclosure assembly of claim 1, in which the woofer emits sound in an upward direction, and the midrange speaker and the tweeter combination emit sound in a downward direction.

3. The in ceiling speaker enclosure assembly of claim 1, in which the woofer, and the midrange speaker and the tweeter combination are coupled electrically via a crossover network.

4. The in ceiling speaker enclosure assembly of claim 1, in which the tuned cavity is cylindrical.

5. The in ceiling speaker enclosure assembly of claim 1, in which the tweeter and the midrange face a floor.

6. The in ceiling speaker enclosure assembly of claim 1, in which the woofer faces a ceiling.

7. The in ceiling speaker enclosure assembly of claim 1, in which the tweeter is a ribbon tweeter.

8. The in ceiling speaker enclosure assembly of claim 1, in which the tweeter and the midrange are oriented coaxially.

9. The in ceiling speaker enclosure assembly of claim 1, in which the sound emitted from the reflects off of a back surface.

10. The in ceiling speaker enclosure assembly of claim 1, in which a sound axis of the woofer and a sound axis of the midrange and tweeter are in parallel.

11. The in ceiling speaker enclosure assembly of claim 1, in which the ported housing has a rectangular shape.

12. The in ceiling speaker enclosure assembly of claim 1, In which an emitting surface of the midrange is flush with the opening.

13. An in ceiling speaker enclosure assembly comprising a ported housing including a tuned cavity;

a woofer mounted in the ported housing; and a midrange speaker and a ribbon tweeter assembly disposed in an interior of the tuned cavity such that the woofer and the midrange speaker and a ribbon tweeter assembly are acoustically coupled via the tuned cavity.

14. The in ceiling speaker enclosure assembly of claim 13, in which the woofer emits sound in an upward direction, and the midrange speaker and a ribbon tweeter combination emit sound in a downward direction.

15. The in ceiling speaker enclosure assembly of claim 13, in which the woofer, and the midrange speaker and a ribbon tweeter combination are coupled electrically via a crossover network.

16. The in ceiling speaker enclosure assembly of claim 13, in which the tuned cavity is cylindrical.

* * * * *